United States Patent
Bradley et al.

(10) Patent No.: US 10,766,381 B2
(45) Date of Patent: Sep. 8, 2020

(54) SYSTEM TO MONITOR PRESENCE OF A BODY IN AN AUTOMOBILE SEAT

(71) Applicant: Cornerstone 5:20, Inc., Pearland, TX (US)

(72) Inventors: Kaci Kay Bradley, Pearland, TX (US); Justin Morgan Bradley, Pearland, TX (US)

(73) Assignee: Cornerstone 5:20, Inc., Pearland, TX (US)

( * ) Notice: Subject to any disclaimer, the term of this patent is extended or adjusted under 35 U.S.C. 154(b) by 484 days.

(21) Appl. No.: 14/223,475

(22) Filed: Mar. 24, 2014

(65) Prior Publication Data

US 2015/0266395 A1    Sep. 24, 2015

(51) Int. Cl.
*B60N 2/00* (2006.01)

(52) U.S. Cl.
CPC .................................. *B60N 2/002* (2013.01)

(58) Field of Classification Search
None
See application file for complete search history.

(56) References Cited

U.S. PATENT DOCUMENTS

| | | | | |
|---|---|---|---|---|
| 5,259,814 | A * | 11/1993 | Weissbrich | B60H 1/00807 236/49.3 |
| 5,361,593 | A * | 11/1994 | Dauvergne | B60H 1/00642 165/238 |
| 6,104,293 | A | 8/2000 | Rossi | |
| 6,581,960 | B1 | 6/2003 | Schondorf et al. | |
| 6,693,535 | B2 * | 2/2004 | Van Bosch | B60R 25/102 701/29.6 |
| 6,922,147 | B1 | 7/2005 | Viksnins et al. | |
| 6,922,622 | B2 | 7/2005 | Dulin et al. | |
| 7,378,979 | B2 | 5/2008 | Rams, Jr. | |
| 7,786,852 | B2 | 8/2010 | Kautz | |
| 8,284,041 | B2 | 10/2012 | Cuddihy et al. | |
| 8,405,725 | B2 | 3/2013 | McMahon et al. | |
| 8,892,302 | B1 * | 11/2014 | McDonald | G08B 21/22 701/36 |
| 2003/0122662 | A1 | 7/2003 | Quinonez | |
| 2005/0038582 | A1 * | 2/2005 | Arndt | B60H 1/008 701/31.4 |
| 2005/0156725 | A1 | 7/2005 | Muhammad | |
| 2006/0082459 | A1 | 4/2006 | Alvarez | |
| 2006/0103516 | A1 | 5/2006 | Zang | |
| 2008/0119989 | A1 | 5/2008 | Henning et al. | |
| 2008/0125941 | A1 | 5/2008 | Mitteer | |

(Continued)

OTHER PUBLICATIONS

"ChildMinder® SoftClip® System*—CM-111", published on or before May 6, 2014, 2 pages. http://www.babyalert.info/childminder-softclip-system.html.

(Continued)

*Primary Examiner* — David P. Merlino
(74) *Attorney, Agent, or Firm* — Covington & Burling LLP

(57) ABSTRACT

One example of a system to monitor a presence of a body in a seat of an automobile can implement a method using processing circuitry. After an automobile engine has stopped operating, the system determines a presence of a body in a seat of the automobile. The system provides a notification indicating the presence of the body in the seat in response to determining the presence of the body in the seat of the automobile.

16 Claims, 10 Drawing Sheets

(56) References Cited

U.S. PATENT DOCUMENTS

| | | | | |
|---|---|---|---|---|
| 2008/0164990 | A1* | 7/2008 | Anderson | B60N 2/002 340/457 |
| 2011/0267186 | A1 | 11/2011 | Rao | |
| 2012/0049495 | A1* | 3/2012 | Harris | B60N 2/002 280/735 |
| 2012/0098655 | A1* | 4/2012 | Preta | B60Q 1/0023 340/438 |
| 2012/0232749 | A1* | 9/2012 | Schoenberg | B60N 2/28 701/36 |
| 2012/0256759 | A1 | 10/2012 | Satpathy | |
| 2012/0268265 | A1 | 10/2012 | Morley et al. | |
| 2013/0021476 | A1* | 1/2013 | Trummer | B60R 22/48 348/148 |
| 2013/0033373 | A1 | 2/2013 | Thomas | |
| 2013/0049955 | A1 | 2/2013 | Hoover et al. | |
| 2013/0201013 | A1* | 8/2013 | Schoenberg | B60N 2/002 340/438 |
| 2013/0218487 | A1 | 8/2013 | Fujii et al. | |
| 2013/0226369 | A1 | 8/2013 | Yorio et al. | |
| 2016/0249191 | A1* | 8/2016 | Avrahami | H04L 67/12 |

OTHER PUBLICATIONS

"ChildMinder® Systems", published on or before May 6, 2014, 2 pages. http://babyalert.info/baby-alert-products/childminder-systems.html.

"Look Before You Lock", HHS HealthBeat, Aug. 16, 2012, 1 pages. http://hhs.gov/news/healthbeat/2012/08/20120816a.html.

"Sliver Cells on the Wearable Solar Power Horizon", TalktoMyShirt, Aug. 18, 2011, 3 pages. http://www.talk2myshirt.com/blog/archives/5411.

"Startup Lumos Brings Wearable Solar Chargers—Plug into the Sun!", Team NextBigWhat, Jan. 30, 2013, 4 pages. http://www.nextbigwhat.com/lumos-solar-chargers-297/.

"The First Years True Fit IAlert C685 Car Seat", published on or before May 6, 2014, 8 pages. http://www.amazon.com/The-First-Years-IAlert-Naturalization/dp/B00A8EZPWG.

"The Forget Me Not Alarm is a Lifesaver", published on or before May 6, 2014, 2 pages. http://mtcbiz.net/forget_me_not_alarm.html.

Jaslow, Ryan, "Gov't Study: Devices that Alert Parents they Left a Child in Car Deemed Unreliable", Jul. 31, 2012, 4 pages. http://www.cbsnews.com/news/govt-study-devices-that-alert-parents-they-left-a-child-in-car-deemed-unreliable/.

Sisters of Intervention, "The Halo Baby Seat Safety System", published on or before May 6, 2014, 2 pages. http://www.sistersofintervention.com/child_products_readch.html.

Suddenly Safe 'N' Secure Systems, Inc., "Toddler Wristband Safe 'N' Secure Alarm System", published on or before May 6, 2014, 1 page. http://shop.suddenlysafensecuresystems.com/Toddler-Wristband-Safe-N-Secure-Alarm-System-A-410.htm.

Texas Instruments—Wiki, "SafeBABI", Last Modified Sep. 27, 2010, 5 pages. http://processors.wiki.ti.com/index.php/SafeBABI.

Turner and McCoy, "Child Car Seat Alarm Systems Alert You When Child is Left in Car [VIDEO]", Aug. 23, 2012, 2 pages. http://mykisscountry937.com/child-car-seat-alarm-systems-alert-you-when-child-is-left-in-hot-car/.

"Evenflo Advanced Embrace DLX Infant Car Seat with SensorSafe, Peridot", Walmart, Published on or before Jul. 23, 2015, [retrieved from internet on Aug. 12, 2015], http://www.walmart.com/ip/Evenflo-Advanced-Embrace-DLX-with-SensorSafe-Peridot/45074201#Item+Description.

Article by Paul Stenquist, How to Remind a Parent of the Baby in the Car? http://www.nytimes.com/2010/05/30/automobiles/30HEAT.html?pagewanted=all&_r=0 ; Published: May 28, 2010 in the NY Times, retrieved from the internet on May 1, 2014; 4 pages.

MTC Products Marketplace, Forget Me Not Car Seat Alarm for the security of your child and personal possessions, http://mtcbiznet/forget_me_not_alarm.html ; retrieved from the internet on May 1, 2014, 2 pages.

Article by Ashley Halsey, II, Forgotten-baby devices don't always work, ,http://www.washingtonpost.com/local/trafficandcommuting/forgotten-baby-devices-dont-always-work/2012/07/30/gJQAQwOiKX_story.html; Published Jul. 30, 2012, in the Washington Post and retrieved from the internet on May 1, 2014, 4 pages.

* cited by examiner

US 10,766,381 B2

SYSTEM TO MONITOR PRESENCE OF A BODY IN AN AUTOMOBILE SEAT

TECHNICAL FIELD

This disclosure relates to monitoring systems implemented in automobiles.

BACKGROUND

Children, elderly persons, or handicapped persons are frequently transported in rear seats of automobiles. Sometimes, automobile drivers forget these passengers in the rear seats. On a hot day in an uncovered parking lot, such forgetfulness can have tragic outcomes.

SUMMARY

This disclosure describes a system to monitor presence of a body in an automobile seat.

Certain aspects of the subject matter described here can be implemented as a method implemented by processing circuitry. After an automobile engine has stopped operating, processing circuitry determines a presence of a body in a seat of the automobile. The processing circuitry provides a notification indicating the presence of the body in the seat in response to determining the presence of the body in the seat of the automobile.

This, and other aspects, can include one or more of the following features. Providing the notification indicating the presence of the body in the seat can include providing an output signal to cause an alarm system of the automobile to sound. A control signal to cause one or more automobile functions to be performed can be provided in response to determining the presence of the body in the seat of the automobile. The one or more automobile functions can include at least one of restarting the automobile engine or restarting a temperature control system of the automobile. The one or more automobile functions can include restarting the temperature control system of the automobile. An ambient temperature outside the automobile can be determined. The temperature control system can be caused to set an interior temperature of the automobile based on the detected ambient temperature. The notification can include transmitting a notification to at least one computer system over a data transmission network. The data transmission network can be at least one of a wired network, a wireless network, a Bluetooth network, or a Global Positioning Satellite (GPS) network. The at least one computer system can be at least one of a mobile device or a computer system of a service provider that monitors the automobile. An identifier representing a geographic location of the automobile can be transmitted over the data transmission network. A control signal can be received over the data transmission network. The control signal can cause one or more automobile functions to be performed in response to providing the notification. The automobile can be caused to perform the one or more automobile functions in response to receiving the control signal. The one or more automobile functions performed in response to receiving the control signal can include at least one of restarting the automobile engine or restarting a temperature control system of the automobile. The seat of the automobile can include at least one of a front-facing child seat, a rearward facing infant seat, a booster seat, a seat for a handicapped person or a seat for an elderly person. Determining the presence of the body in the seat of the automobile can include determining the presence of the body in the seat for a threshold amount of time starting from a time at which the automobile engine stopped operating. After providing the notification indicating the presence of the body in the seat, it can be sensed, for a duration of time, if the body is present in the seat. The presence or an absence of the body in the seat can be determined before the duration expires in response to the sensing. Providing the notification can be continued or ceased in response to determining the presence or the absence, respectively, of the body in the seat after the duration expires. Determining the presence of the body in the seat can include determining the presence of the body in the seat based on a load value represented by a load signal received from a load sensor connected to the seat. Determining the presence of the body in the seat can include determining the presence of the body in the seat based on a positive signal received from a contact sensor connected to a fastening mechanism installed on the seat. The contact sensor can be configured to transmit the positive signal in response to fastening mechanism being engaged to fasten the body to the seat. Determining that the automobile engine has stopped operating can include determining that an ignition of the automobile engine has gone to ground.

Certain aspects of the subject matter described here can be implemented by processing circuitry. It is determined, by processing circuitry implemented in an automobile, if an environmental automobile condition from among multiple environmental automobile conditions is satisfied. It is determined if a load is present in a seat of the automobile when the environmental automobile condition is satisfied. An output signal is provided indicating that the load is present in the seat of the automobile when the environmental automobile condition is satisfied.

This, and other aspects, can include one or more of the following features. A stoppage of an automobile engine can be the environmental condition that is satisfied.

Certain aspects of the subject matter described here can be implemented as an automobile monitoring system. The system includes a sensor connected to a seat of an automobile to determine a presence of a body in the seat. The system can include processing circuitry to perform operations including, after an automobile engine has stopped operating, receiving a signal from the sensor, the signal indicating a presence of a body in the seat of the automobile, and providing a notification indicating the presence of the body in the seat in response to receiving the signal indicating the presence of the body in the seat of the automobile.

This, and other aspects, can include one or more of the following features. The sensor can include at least one of a load sensor to determine a presence of a load in the seat or a from a contact sensor connected to a fastening mechanism installed on the seat. The contact sensor can be configured to transmit the positive signal in response to fastening mechanism being engaged to fasten the body to the seat. Providing the notification indicating the presence of the body in the seat can include at least one of providing an output signal to cause an alarm system connected to the automobile engine to sound or providing a control signal to cause one or more automobile functions to be performed. The one or more automobile functions can include at least one of restarting the automobile engine, restarting a temperature control system of the automobile, or transmitting a signal indicating the presence of the body in the seat to a computer system over a data transmission network.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
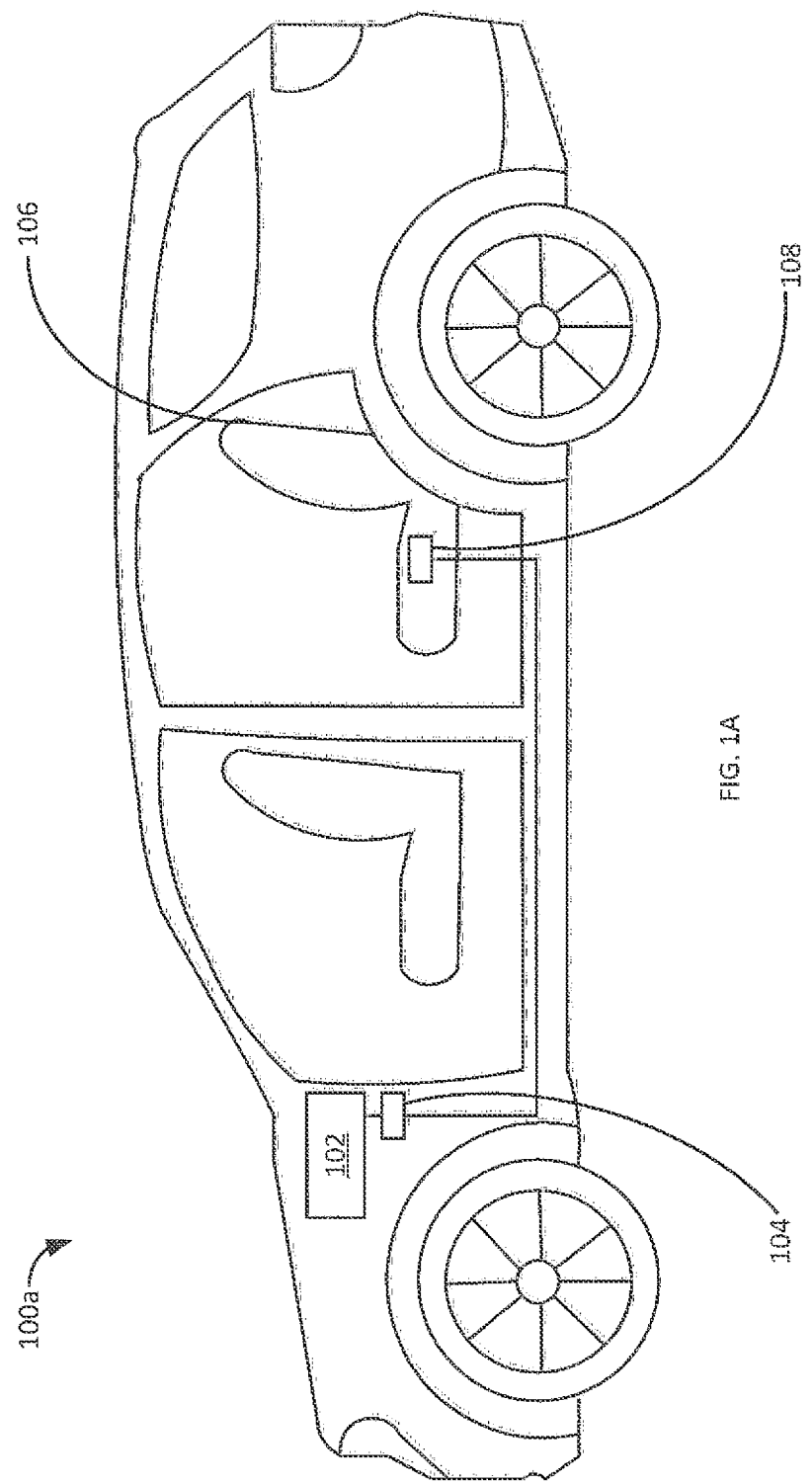
FIGS. 1A-1G are schematic diagrams showing examples of automobiles including monitoring systems.

This disclosure describes a system for monitoring a presence of a body in an automobile seat or in any other location in the automobile. The monitoring system can be implemented to determine the presence of the body in any seat of the automobile (e.g., a passenger seat in any of the rear rows of the automobile, a passenger seat in a front row of the automobile, or any other seat in the automobile) and/or any location in the automobile (e.g., a floor of the automobile, a rear bed of the automobile on which a seat such as a handicapped person's seat or other location in the automobile). The monitoring system can, alternatively or in addition, be implemented to determine the presence of a body on a seat positioned on an automobile seat or at some location in the automobile. Such a seat can include, e.g., a forward facing child seat, a rear facing infant seat, a booster seat, a seat designed for a handicapped person and/or an elderly person, or other seat that is positioned over an automobile seat.

The monitoring system can be implemented to perform one or more of various operations (described below) in response to determining the presence of the body in the automobile seat. For example, in response to determining the presence of a body in a child seat, the monitoring system can cause an automobile alarm sound. Alternatively or in addition, the monitoring system can cause a notification to be sent, e.g., to a person associated with the automobile, to a person or third-party monitoring the automobile, to emergency personnel, or to others. In some situations, the monitoring system can cause certain automobile operations, e.g., starting the automobile engine, running the automobile temperature control system, lowering the automobile windows, or other automobile operations, to be performed in response to determining the presence of a body in the automobile seat.

The monitoring system described here can save lives. Occasionally, a parent, who is in a rush, forgets a child in a car seat, and leaves the car for an extended period of time lot on a hot day resulting in tragedy. In such a situation, the monitoring system can provide a notification that a body is present in the car seat to several persons and/or entities, e.g., people within hearing range of the automobile, the automobiles operator, emergency services personnel, or others. A responder, in such a situation, can remove the child from the automobile, potentially saving the child's life. The monitoring system can cause the automobile to perform automobile operations, e.g., operating the automobiles temperature control system, or other automobile operations. The automobile operation can maintain a safe and/or comfortable environment for the child until the responder arrives at the automobile to remove the child. The monitoring system described here can similarly save lives of other persons, e.g., handicapped persons, disabled persons, or other persons or animals, who have been left behind in automobiles. The monitoring system described here can be installed in automobiles either as a feature of the automobiles alarm system or as a stand-alone feature.

FIGS. 1A-1G are schematic diagrams showing examples of automobiles including monitoring systems. FIG. 1A is a schematic diagram showing an example of an automobile 100a implementing a monitoring system. The monitoring system includes a sensor 108 connected to a seat 106 of the automobile 100a (e.g., any one of the rear seats in any of the rear rows of the automobile 100a). The sensor 108 is configured to determine a presence of a body in the seat 106. The monitoring system includes processing circuitry 104 that is connected to the sensor 108 and the engine 102 of the automobile 100a. In some implementations, after the engine 102 of the automobile 100a has stopped operating, the processing circuitry 104 receives a signal from the sensor 108. The signal indicates a presence of a body in the seat 106 in the automobile 100a. The processing circuitry 104 provides a notification indicating the presence of the body in the seat 106 in response to receiving the signal.

Figure 1B:
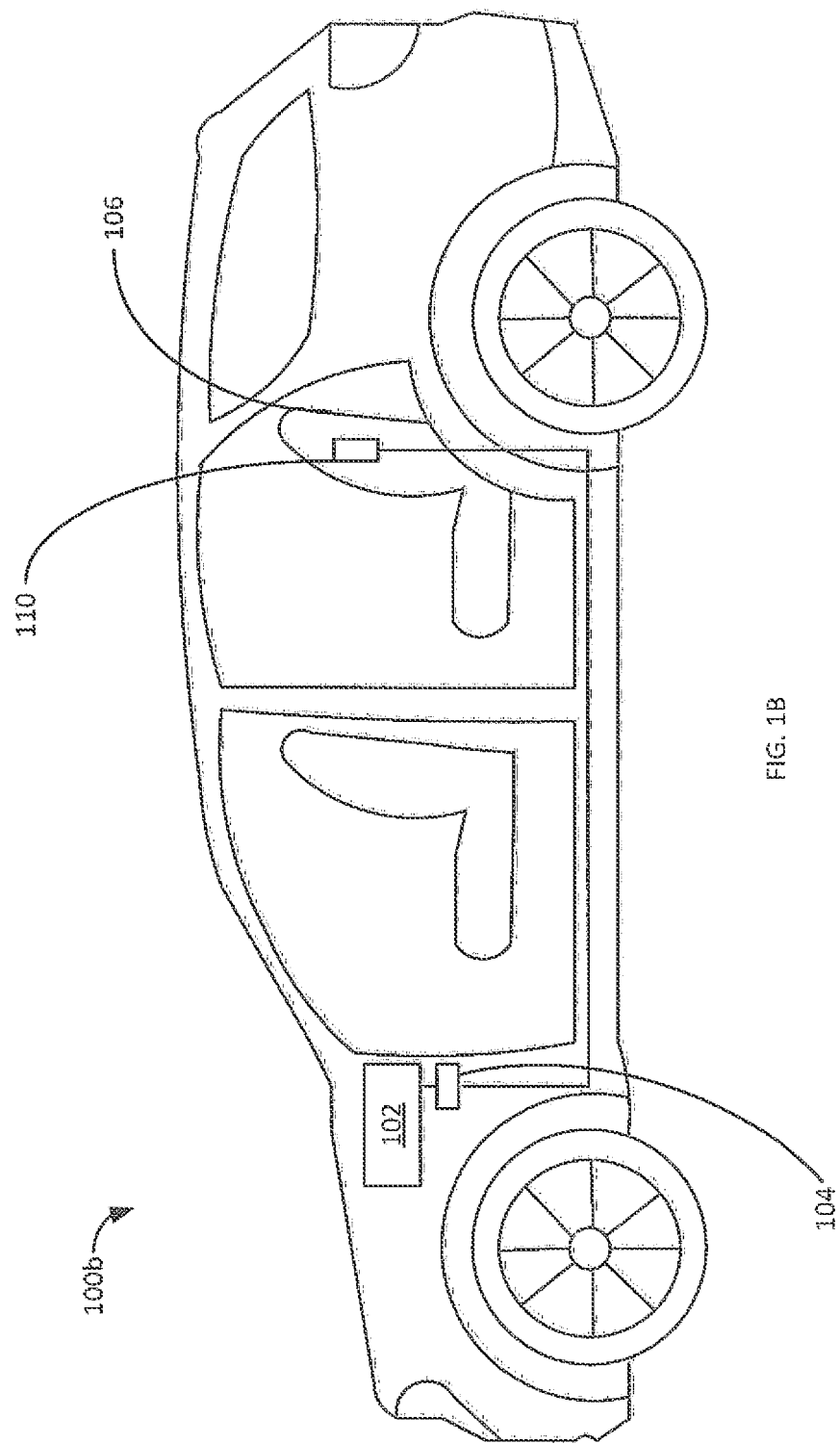
Figure 1C:
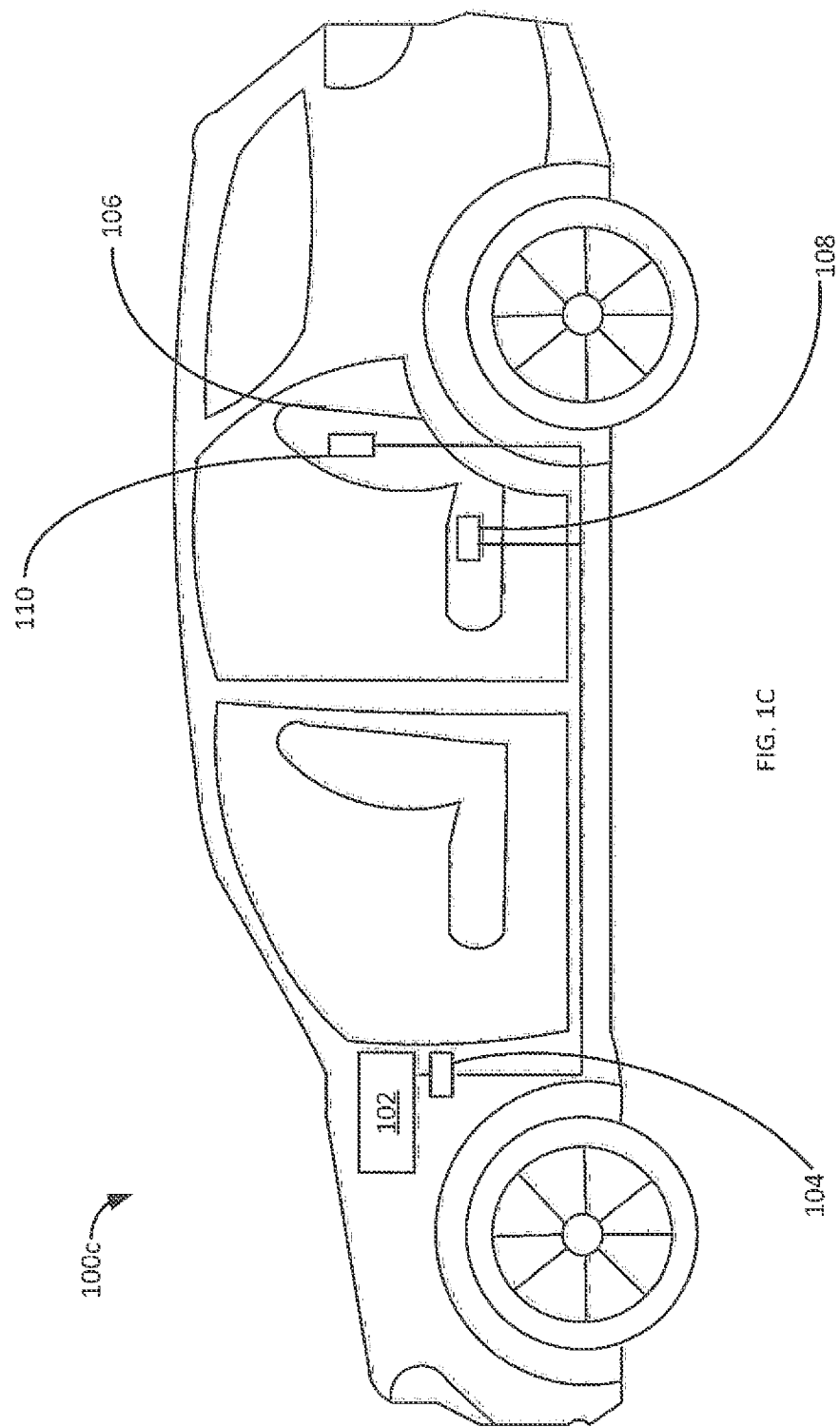
Figure 1D:
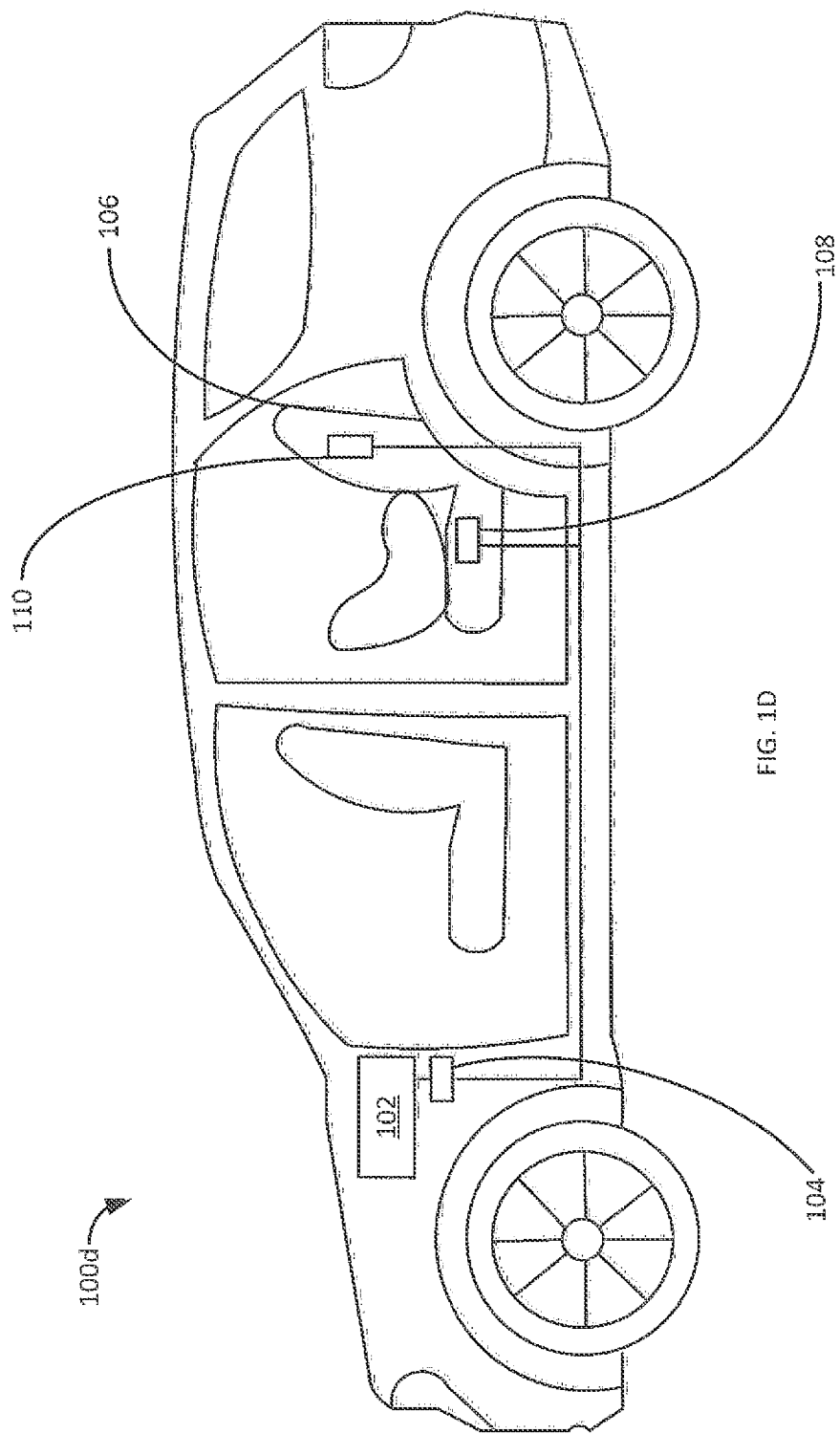
Figure 1E:
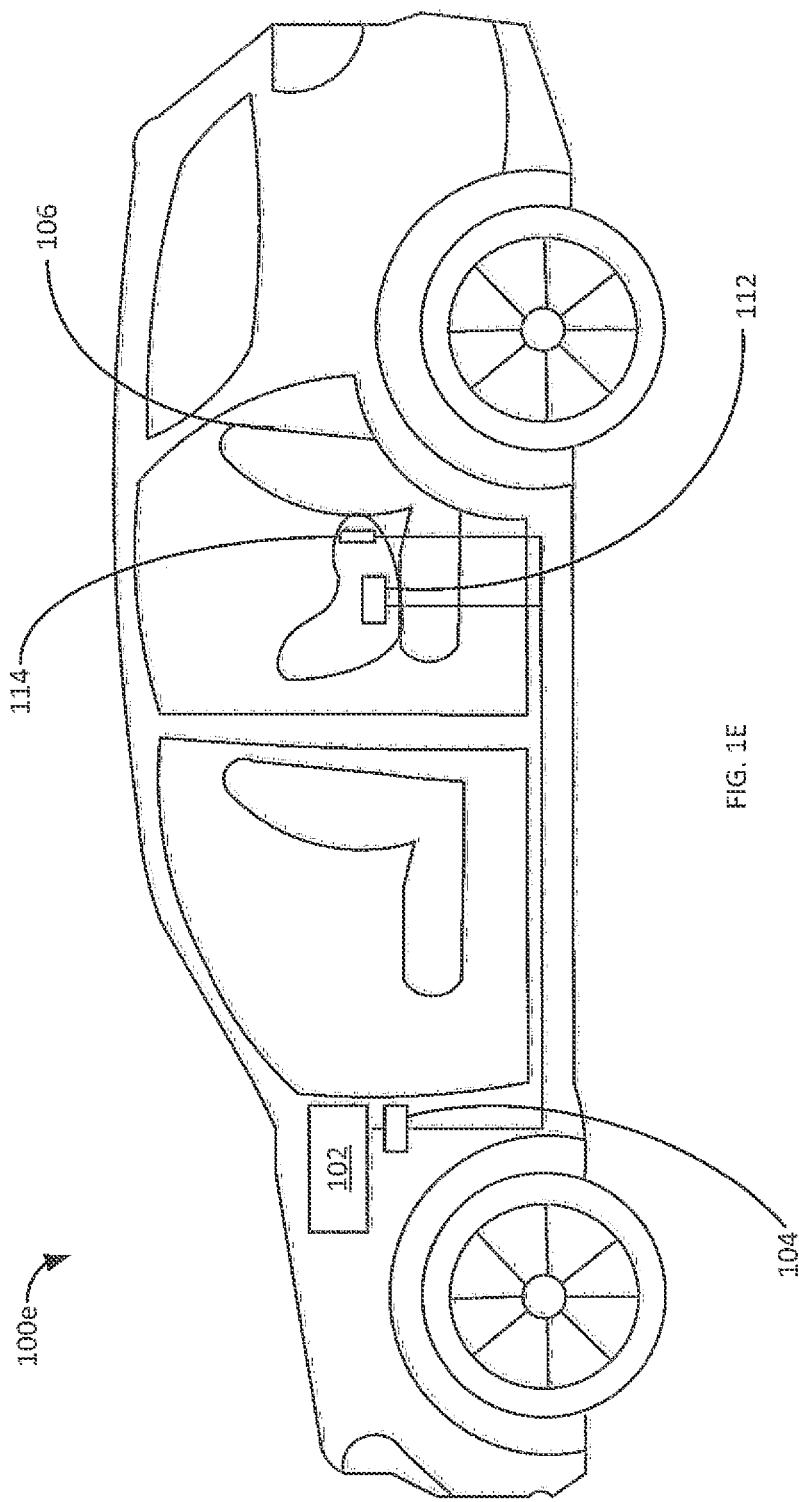
Figure 1G:
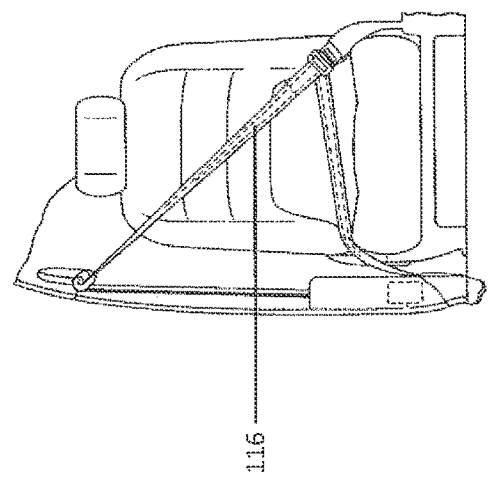
Figure 1F:
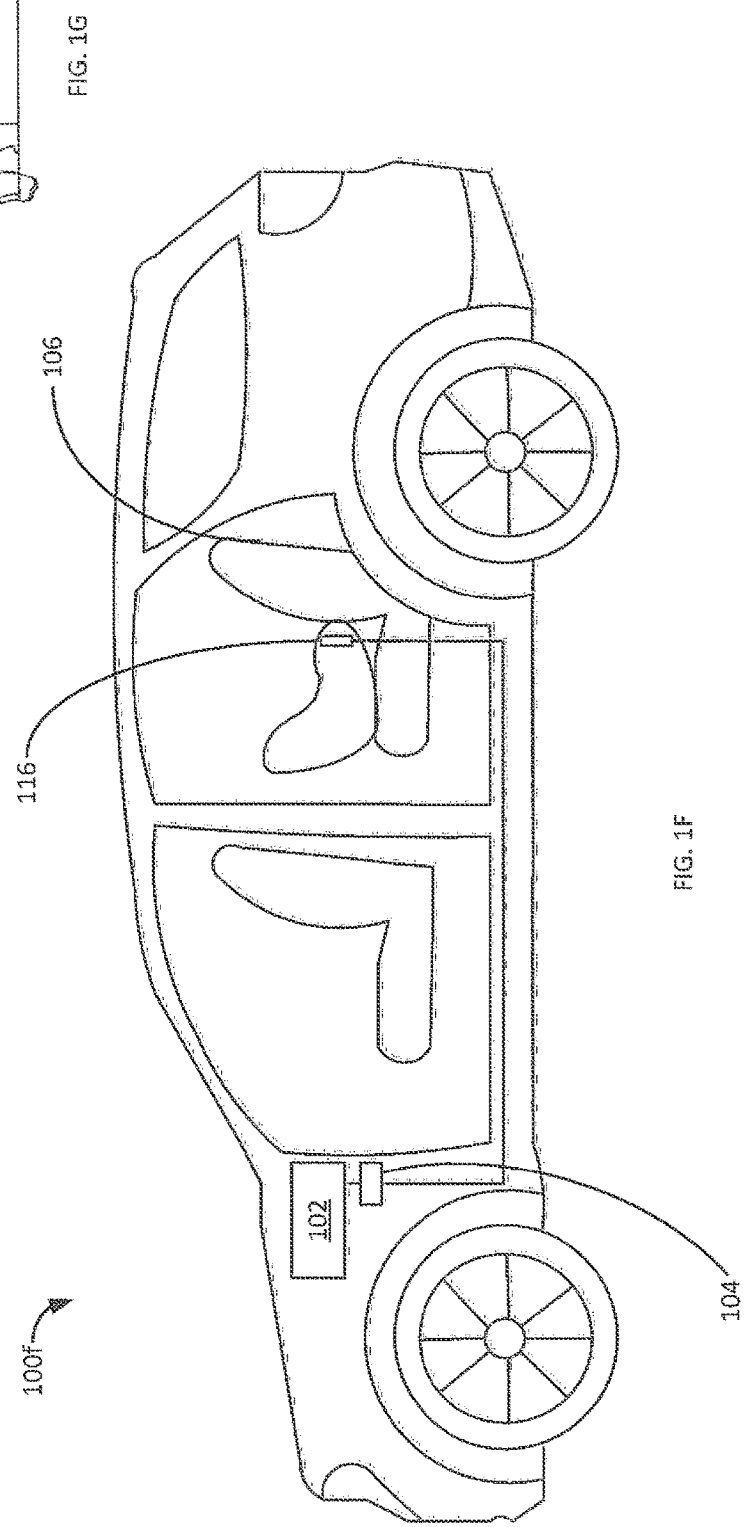

In the example automobile 100a, the sensor 108 is installed in the seating surface of the seat 106. FIG. 1B is a schematic diagram showing an example of an automobile 100b implementing a monitoring system in which the sensor 110 is installed on a back surface of the seat 106. FIG. 1C is a schematic diagram showing an example of an automobile 100c implementing a monitoring system including two sensors—the sensor 108 installed in the seating surface and the sensor 110 installed in the back surface of the seat 106. FIG. 1D is a schematic diagram showing an example of an automobile 100d in which a child seat (e.g., a forward facing child seat, a rear facing infant seat, a booster seat, or other child seat) is positioned on the seat 106 in which either the sensor 108 or the sensor 110 (or both) are installed. FIG. 1E is a schematic diagram showing an example of an automobile 100e implementing a monitoring system in which one or more sensors are installed in the child seat, which is then positioned on the seat 106 of the automobile 100e. In such implementations, either a sensor 112 or a sensor 114 (or both) can be installed in a bottom surface or a back surface (or both), respectively, of the car seat. The sensor (or sensors) is connected to the processing circuitry 104, which, in turn, is connected to an engine 102 of the automobile 100e. FIG. 1F is a schematic diagram showing an example of an automobile 100e implementing a monitoring system in which a sensor 116 is mounted to a seatbelt that will be worn by a person sitting on the seat 106.

In some implementations, a sensor that is included in the monitoring system can be a load sensor or a weight sensor (e.g., a pressure switch). In implementations in which the load sensor is installed in the bottom surface of the seat 106, the load sensor can be configured to sense no weight when the seat 106 is unoccupied and to sense a weight when the seat 106 is occupied. That is, the load sensor can be configured to provide no signal when the seat 106 is unoccupied and to provide a load signal indicating a load value when the seat 106 is occupied. In implementations in which the load sensor is installed in the back surface of the seat 106, the load sensor can be configured to sense a weight of a person leaning against the back surface. In some implementations, load sensors can be positioned in the bottom surface and the back surface of the seat 106. In implementations in which a car seat is positioned on the seat 106, the load sensor can be configured to sense the weight of the car seat as a tare weight and to sense a sum of the weight of the car seat and the weight of a body placed in the car seat as a gross weight. In such implementations, the load sensor can sense a load when a sensed fleet is greater than the tare weight. In some implementations, the load sensor can be installed in the car seat and connected to the monitoring system installed in the automobile.

In some implementations, a sensor that is included in the monitoring system can be a contact sensor that can send a positive signal when in contact with another object, e.g., a body of a person. For example, the contact sensor can transmit a positive signal in response to a fastening mechanism being engaged to fasten the body to the seat. Seat belts that are installed in front seats of automobiles are examples of such contact sensors. Such a contact sensor can be installed in either the bottom surface or the side surface (or both) of the seat 106 or in a seatbelt that is worn across the seat 106. Alternatively or in addition, such a contact sensor can be installed, e.g., in a seat belt buckle.

In some implementations, the monitoring system can include both a weight sensor and a contact sensor. The weight sensor can be installed in any portion of the seat in which a load of the person occupying the seat can be detected. The contact sensor can be installed in any portion of the seat in which a contact with the person occupying the seat can be detected. In some implementations, the sensor (either the weight sensor or the contact sensor or both) can be implemented as a single unit, while in others the sensor can be implemented as a distributed sensor array. For example, each distributed sensor of the array can be installed at respective positions in the seat of the automobile or in the car seat positioned on the automobile or combinations of them. The monitoring system can sense the presence of a body in the seat or in the car seat or both based on one or more or all signals from the distributed sensors in the distributed sensor array.

In example implementations described with reference to FIGS. 1A-1G, the sensor (or sensors) is installed either in the seat of the automobile or in a seatbelt that is worn across the seat. Alternatively or in addition, the sensor (or sensors) can be installed in any restraining system that is used to secure a body or an object to the seat of the automobile. For example, the sensor (e.g., a weight sensor, a contact sensor, or other sensor) can be installed in a harness that is used to secure an elderly person to an automobile seat. In another example, a sensor (e.g., a weight sensor, a contact sensor, or other sensor) can be installed in latch mechanisms that secure car seats to the automobile. In this example, the monitoring system can be configured to determine that children may be present in the automobile in response to receiving a positive signal indicating that the latch mechanisms, e.g., on specifically modified handicap seats, are operational.

In example implementations described here, the processing circuitry of the monitoring system is connected to the engine of the automobile. Alternatively or in addition, the processing circuitry can be connected to other features of the automobile that control automobile operations. For example, the processing circuitry can be connected to an automobile battery, which, either independently or in conjunction with the engine of the automobile, can cause the automobile to perform operations. Thus, the processing circuitry need not always be connected to the engine of the automobile. Rather, the processing circuitry can be connected to any feature of the automobile that can cause the automobile to perform automobile operations.

Figure 2:
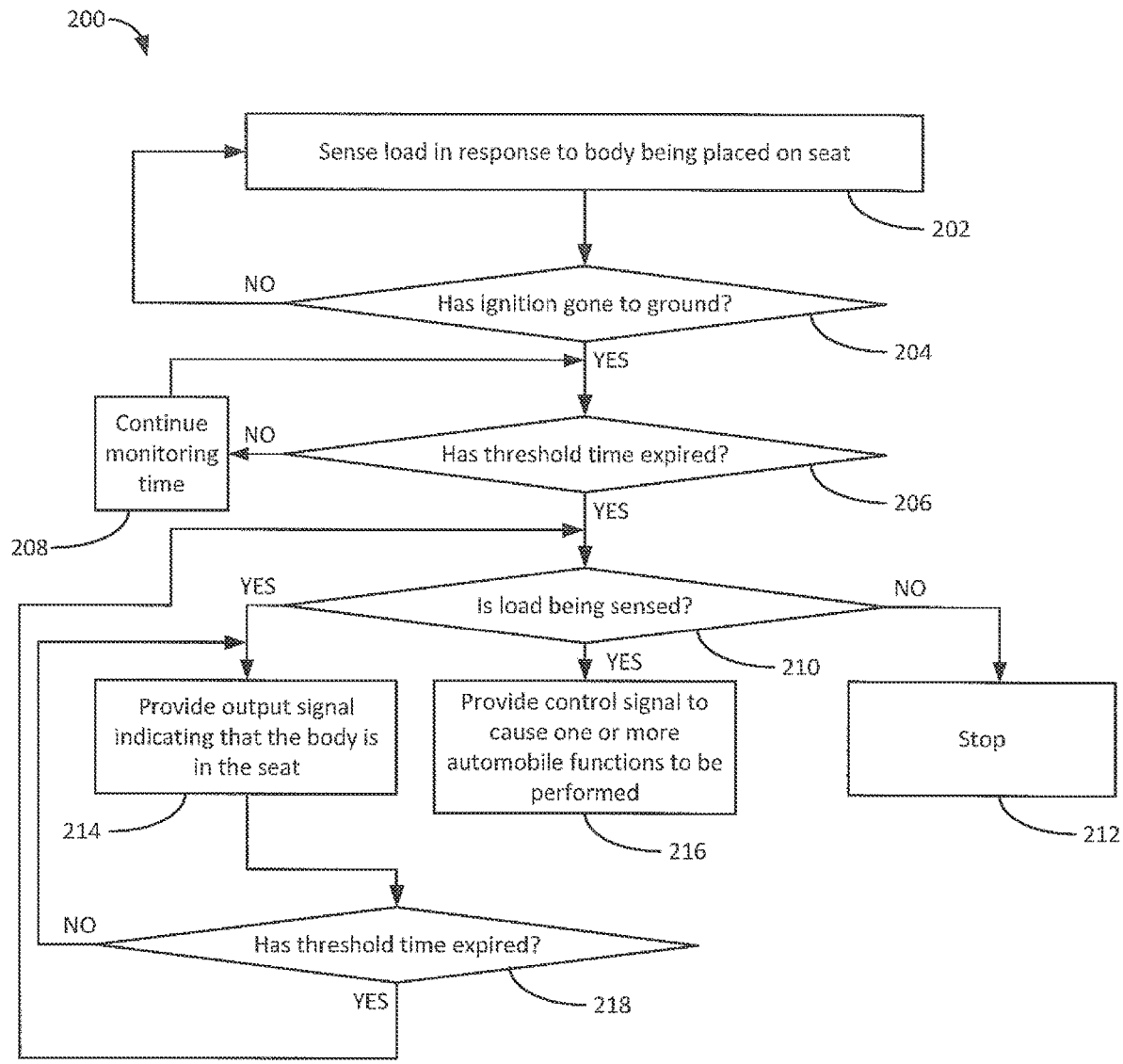
FIG. 2 is a flowchart of an example process for responding to a presence of a body in an automobile seat.

FIG. 2 is a flowchart of an example process 200 for responding to a presence of a body in an automobile seat. The process 200 can be performed by the processing circuitry 104 and one or more sensors in conjunction with other components of the monitoring system described above with reference to FIGS. 1A-1G. At 202, the load can be sensed in response to a body being placed on a seat. For example, the processing circuitry 104 can determine a presence of a body in the seat of the automobile in response to a load sensor installed at any location on an automobile seat (such as, the bottom surface, the back surface, or other location on the seat) sensing a weight of the body (such as, that of a person's body) being placed on the seat. In implementations in which the load sensor is connected to or installed in a child seat, the load sensor can sense a tare weight as being the weight of the child seat and a gross weight as being a sum of the weight of the child seat and the weight of the body placed in the child seat. The load sensor can sense the load either before or after the automobile ignition has been turned on. In some implementations, the processing circuitry 104 can determine a presence of a body in the seat of the automobile in response to receiving a positive signal from a contact sensor installed at any location in the automobile.

At 204, a check can be performed to determine if the automobile ignition has gone to ground. For example, the processing circuitry 104 can determine if the automobile ignition has gone to ground. The automobile ignition going to ground can mean that the engine 102 of the automobile has stopped operating. Alternatively or in addition, the automobile engine going to ground can mean that a key in the ignition has been turned from an on position to an off position or to an intermediate position (e.g., an auxiliary position or accessory position or other intermediate position). In the off position, the engine of the automobile can have stopped, and yet a battery of the automobile can continue to receive power to perform certain automobile operations. Alternatively, in the off position, all automobile operations can have stopped. The automobile ignition going to ground can mean that the key has been removed from the ignition. In automobiles that operate using push start/stop buttons, the automobile ignition going to ground can mean that the push button has been pushed to stop the automobile operation. In general, the automobile ignition going to ground can mean that the automobile has gone from an operational mode in which the automobile can perform any automobile operation to a semi-operational or a non-operational mode in which the automobile can perform fewer or no automobile operations.

If the processing circuitry 104 determines that the ignition has not gone to ground, then the processing circuitry 104 can continue to sense load in response to the body being placed on the seat (decision branch "No"). If the processing circuitry 104 determines that the ignition has gone to ground (decision branch "Yes"), then at 206 a check can be performed to determine whether a threshold time has expired. For example, the monitoring system can include a timer (not shown) that the processing circuitry 104 can start running upon determining that the ignition has gone to ground. The processing circuitry 104 can wait for a predetermined threshold time to expire. The threshold time can be sufficient for an operator of the automobile to remove the body that is placed on the seat. The threshold time to remove a child from a child seat can be different from the threshold time to remove an infant seat from an infant seat base and can further be different from the threshold time to remove an elderly person or a handicapped person from the seat. For example, the threshold time can be one minute or less or more time. In some implementations, the threshold time can be configured (i.e., changed) based on user-preference.

If the processing circuitry 104 determines that the threshold time has not expired (decision branch "No"), then, at 208, monitoring can be continued. For example, the processing circuitry 104 can continue to run the timer for a duration starting from a time at which the ignition went to ground until the predetermined threshold time expires. If the processing circuitry 104 determines that the threshold time has expired (decision branch "Yes"), then at 210, a check can be performed to determine whether the load is being sensed. In some implementations, in response to the timer expiring, the processing circuitry 104 can determine whether the sensor is continuing to sense the presence of the body on the seat. For example, the processing circuitry 104 can check if the load sensor is continuing to sense a load or if the contact sensor is continuing to send a positive signal indicating contact, or combinations of them. In some implementations, the processing circuitry 104 can determine that the automobile has been locked after the ignition has gone to ground. Such locking of the automobile can serve as an alternative to an expiration of the timer. In some implementations, the processing circuitry 104 can check for a combination of an expiration of the timer and a locking of the automobile. In some implementations, the processing circuitry 104 can start the timer upon detecting that the automobile has been locked.

If the processing circuitry 104 determines that the presence of the body on the seat is not being sensed (decision branch "No"), then, at 212, the process 200 stops. For example, the processing circuitry 104 determines that the body has been removed from the seat and ceases to operate the load-sensing operations. If the processing circuitry 104 determines that the presence of the body on the seat is still being sensed (decision branch "Yes"), then, at 214, an output signal indicating that the body is in the seat is provided. For example, when the processing circuitry 104 continues to receive a signal indicating that the body is present on the seat, then the processing circuitry 104 can provide the output signal which can serve as a notification indicating the presence of the body in the seat. In some implementations, the processing circuitry 104 can provide a signal to the alarm system of the automobile causing the alarm system to sound. Alternatively, or in addition, the monitoring system can include a speaker (not shown) to which the processing circuitry 104 can provide the output signal causing the speaker to output an audible sound. Either the automobile's alarm system or the monitoring system's speaker (or both) can be configured to provide an audible sound that is different from a conventional car alarm. For example, the audible sound can include a message such as "Passenger in automobile" or the like. In some implementations, the processing circuitry 104 can cause the automobile to open locked doors so that a responder can enter the automobile to remove the body from the seat.

In some implementations, if the processing circuitry 104 determines that the presence of the body on the seat is still being sensed (decision branch "Yes"), then, at 216, a control signal can be provided to cause one or more automobile functions to be performed. The processing circuitry 104 can provide the control signal as an alternative to or in addition to providing the output signal indicating that the body is in the seat. The one or more automobile functions can include at least one of restarting the automobile engine or restarting a temperature control system of the automobile or both. For example, in response to determining that the load is still being sensed after expiration of the timer, the processing circuitry 104 can provide a control signal to restart the automobile and to start the automobile's temperature control system. In another example, the processing circuitry 104 can provide a control signal to start the automobile's temperature control system without restarting the automobile.

In some implementations, the processing circuitry 104 can determine an ambient temperature outside the automobile. The processing circuitry 104 can cause the temperature control system to set an interior temperature of the automobile based on the detected ambient temperature. For example, if the processing circuitry 104 determines that it the ambient temperature is above a threshold temperature (such as, 85° F. or higher), then the processing circuitry 104 can cause the temperature control system to turn on the air conditioner to cool the interior of the automobile. Conversely, if the processing circuitry determines that the ambient temperature is below a threshold temperature (such as, 65° or lower), then the processing circuitry 104 can cause the temperature control system to turn on the air conditioner or heating unit to heat the interior of the automobile.

In some implementations, the processing circuitry 104 can start the temperature control system based on a difference between the automobile's interior temperature and the ambient temperature. For example, the automobile's interior temperature may not be substantially different from the ambient temperature for a while after the automobile has stopped. That may not be a need to restart the automobile's temperature control system until the difference has become substantial. The processing circuitry 104 can include temperature sensors (not shown) inside and outside the automobile to sense the automobile's interior temperature and the ambient temperature, respectively. As long as the difference between the automobile's interior temperature and the ambient temperature is within a range (e.g., 10° F. or 15° F. or other temperature difference) the processing circuitry 104 may not cause the automobile's temperature control system to start. Once the difference falls outside the range, the processing circuitry 104 may cause the automobile's temperature control system to start and to set an automobile's interior temperature as described above. In some implementations, the processing circuitry 104 may continue to monitor the difference between the automobile's interior temperature and the ambient temperature after the automobile's temperature control system has restarted. When the processing circuitry 104 determines that the difference is once again within the range, the processing circuitry 104 can the automobile's temperature control system to stop. Doing so can save power (e.g., gas, battery, hybrid, or other power) used to power the automobile's temperature control system. In such implementations, the processing circuitry 104 can continue to provide the output signal indicating that the body is in the seat, e.g., to cause an audible alarm sound.

Returning to FIG. 2, at 218, a check is performed to determine if a threshold time has expired after, at 210, it is determined that the load is being sensed, and, at 214, the output signal is provided and/or, at 216, the control signal to cause one or more automobile functions to be performed is provided. For example, the processing circuitry 104 can run the timer for a predetermined threshold time (such as, 10 minutes or more or less time) after determining that the load is being sensed after the ignition has gone to ground. In some implementations, upon expiration of this predetermined threshold time (decision branch "Yes"), the processing circuitry 104 will cause the automobile and/or the automobile's temperature control system to cease operating. The processing circuitry 104 will then re-implement a portion of process 200 starting at step 210. That is, the processing circuitry 104 will check if the load is being sensed after causing the automobile and/or the automobile's temperature control system to cease operating. If yes, then the processing circuitry 104 will either provide the output signal indicating that the body is in the seat or provide the control signal to cause one or more automobile functions to be performed, as described above, or both. If the processing circuitry 104 determines that the predetermined threshold time has not expired (decision branch "No"), then the processing circuitry 104 can continue to provide the output signal indicating that the body is in the seat or provide the control signal to cause one or more automobile functions to be performed, as described above, or both.

Figure 3:
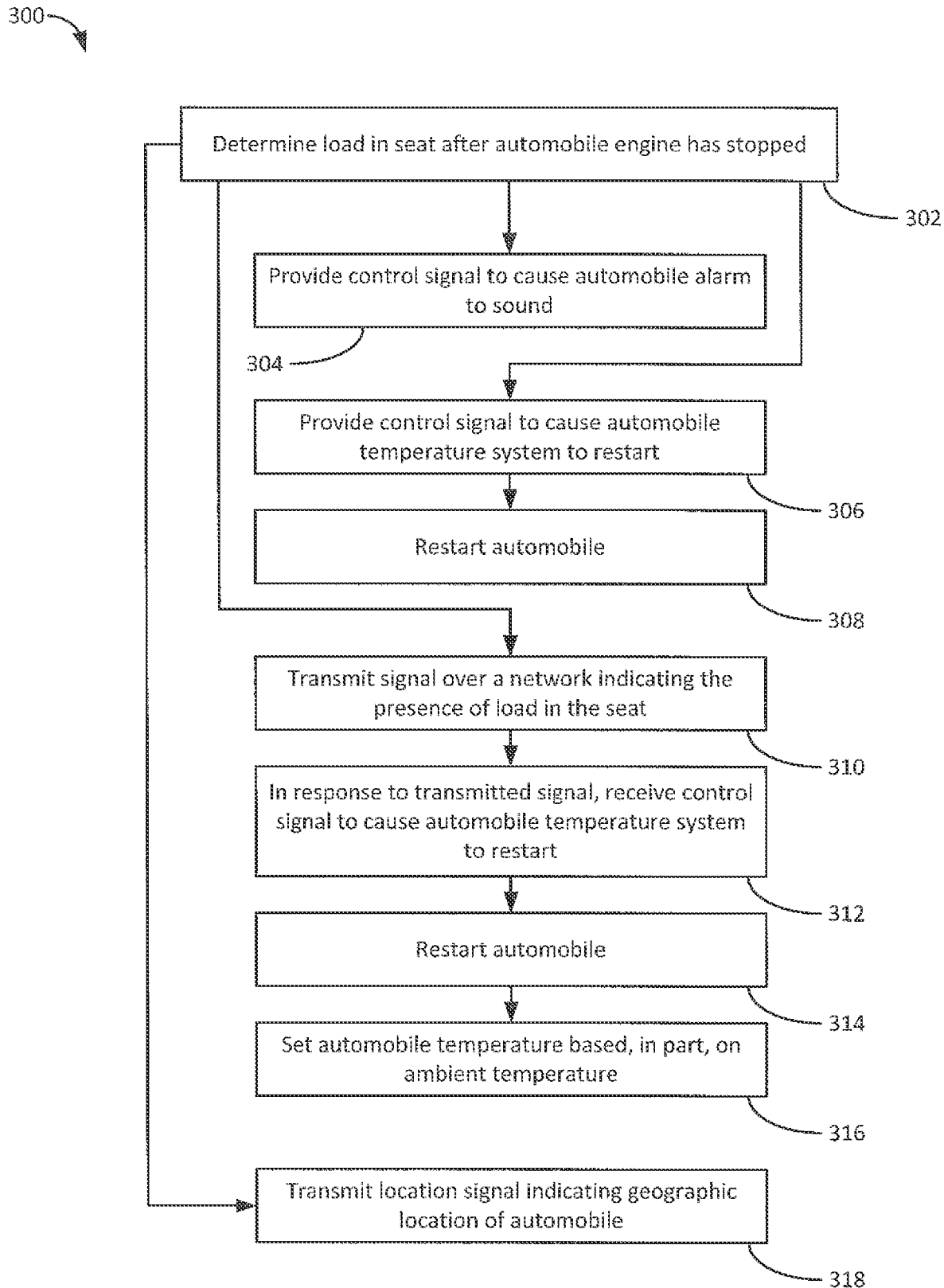
FIG. 3 is a flowchart of an example process for responding to a presence of a load in an automobile seat.

FIG. 3 is a flowchart of an example process 300 for responding to a presence of a load in an automobile seat. The process 300 can be performed by the processing circuitry 104 and one or more sensors in conjunction with other components of the monitoring system. At 302, it can be determined that the load is in the seat after the automobile engine has stopped. For example, the automobile ignition going to ground can indicate that the automobile engine has stopped. The processing circuitry 104 can determine that the load is in the seat after the automobile engine has stopped as described above with reference to FIG. 2. At 304, a control signal to cause the automobile alarm to sound can be provided. For example, the processing circuitry 104 can transmit an output signal to cause the automobile alarm to sound as described above with reference to FIG. 2.

At 306, a control signal to cause the automobile temperature system to restart can be provided, and, at 308, the automobile can be restarted. For example, the processing circuitry 104 can provide a control signal to the automobile to restart the automobile engine causing the automobile engine to start the automobile's temperature control system. Alternatively, the processing circuitry can provide a control signal to cause the automobile to restart only the automobile's temperature control system without restarting the automobile engine, as described above with reference to FIG. 2. In some implementations, the processing circuitry 104 can start and run a remote start timer for a certain duration after the automobile engine has restarted. When the timer expires, the ignition can go to ground, and, responsively, the processing circuitry 104 can start and run the timer described above for the threshold time sufficient for an operator of the automobile to remove the body that is placed on the seat. In this manner, the processing circuitry 104 can restart the monitoring process until the child or person is removed from the seat of the automobile.

At 310, a signal can be transmitted over a network indicating the presence of load in the seat. For example, the automobile can include hardware, software, firmware, or combinations of them that connects the automobile to one or more computer systems over a data transmission network such as a wired network, a wireless network, a Bluetooth network, a satellite network (e.g., Global Positioning Satellite (GPS) network) for combinations of them. The processing circuitry 104 can transmit the signal over the data transmission network to a computer system, the signal indicating the presence of a body in the seat.

For example, the processing circuitry 104 can transmit the signal to a mobile device of the automobiles operator. The mobile device can include, e.g., a laptop computer, a tablet computer, a smart phone, a personal digital assistant, or other mobile device, that is connected to the automobile over the data transmission network. Upon receiving the signal from the automobile, the mobile device can execute a computer software application configured to provide an alert (e.g., a visual alert, an audible alert, a vibration alert, or combinations of them) to the user of the mobile device. For example, the automobile can include a camera showing the interior of the automobile. The processing circuitry 104 can transmit images captured by the camera to the mobile device. The mobile device can execute the computer software application to display the images in a user interface of the mobile device. Upon receiving the alert, the user of the mobile device can take action to remove the child from the seat. Alternatively or in addition, the processing circuitry 104 can transmit or cause another computer system (e.g., a GPS system) to transmit an identifier (e.g., latitude, longitude coordinates) identifying a geographic location of the automobile.

In another example, the processing circuitry 104 can transmit the signal to a computer system of a service provider that monitors the automobile. OnStar™, offered by OnStar Corporation of Michigan, USA, is an example of such a service provider. Upon receiving the signal, the service provider can contact the automobile owner and/or emergency personnel. In addition to transmitting the signal, the processing circuitry 104 can transmit an identifier representing a geographic location of the automobile over the data transmission network.

At 312, a control signal can be received at the automobile in response to the transmitted signal. The control signal can cause the automobile temperature system to restart. For example, automobile manufacturers offer computer software applications (such as, smart phone applications) that allow causing the automobile to perform certain functions by sending control signals over data transmission networks. When the automobile owner's mobile device receives the signal indicating that a body is present in the seat, the automobile owner can transmit a control signal to the automobile to cause the automobile temperature system to restart. At 314, the automobile can be restarted. For example, the automobile can't receive the signal and, in response, start the automobile engine. At 316, the automobile temperature can be set based, in part, on ambient temperature. For example, the processing circuitry can cause the automobile temperature control system to run at a particular temperature based on the ambient temperature as described above. The control signal can, alternatively or in addition, be received from other recipients of the signal transmitted by the automobile, e.g., the service provider, the emergency personnel, or other recipients.

At 318, a location signal indicating a geographic location of the automobile can be transmitted over the data transmission network. For example, the processing circuitry 104 can transmit GPS coordinates to the service provider. This can allow the service provider to notify the automobile owner and or the emergency personnel of the exact location of the automobile. In another example, the processing circuitry 104 can transmit the signal with or without the GPS coordinates to a computer system of the emergency personnel (e.g., police, emergency medical technicians, fire department or other emergency personnel).

Figure 4:
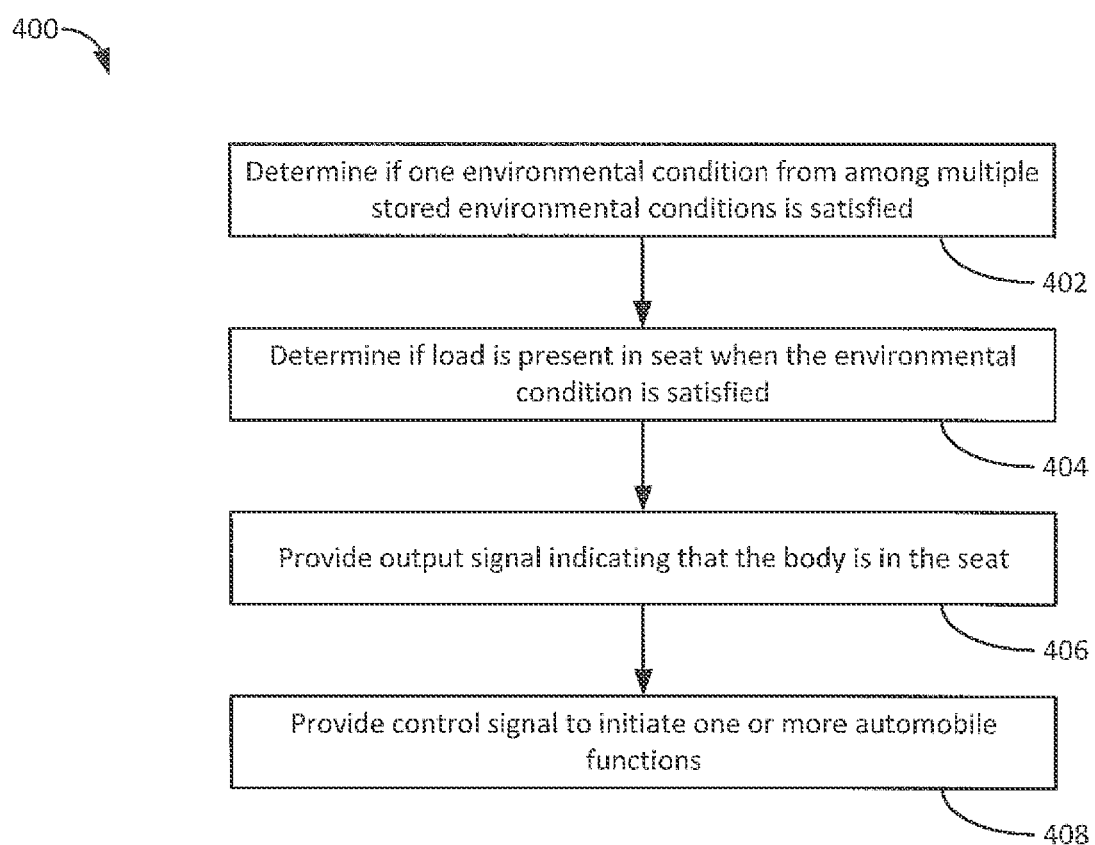
FIG. 4 is a flowchart of an example process for responding upon determining that an automobile environmental condition has been satisfied.

FIG. 4 is a flowchart of an example process 400 for responding upon determining that an automobile environmental condition has been satisfied. As an alternative to or in addition to the processing circuitry 104, the process 400 can be performed by a computer system and one or more sensors in conjunction with other components of the monitoring system. At 402, it can be determined if one environmental condition from among multiple stored environmental conditions is satisfied. For example, the computer system can store multiple environmental conditions. The multiple environmental conditions can include, e.g., one or more of a stoppage of the automobile engine, the engine ignition going to ground, an interior temperature of the automobile being significantly different from (e.g., higher than or lower than) an ambient temperature surrounding the automobile, the automobile being stationary at a location for a duration that is longer than a threshold duration, combinations of them, or other environmental conditions. In some implementations, the computer system can include a computer-readable storage medium in which identifiers indicating the multiple environmental conditions can be stored. The computer-readable storage medium can also store computer instructions executable to cause the automobile to perform operations. The computer system can include data processing apparatus (e.g., one or more processors) to execute the computer instructions.

At 404, it can be determined if a load is present in a seat when the environmental condition is satisfied. For example, the computer system can implement all or portions of the process 200 described above to determine if a body is present in the automobile seat. In this manner, the computer system can determine if an environmental condition from among the multiple environmental conditions has been satisfied together with a body being present in the automobile seat. For example, the computer system can receive signals from one or more sensors of the monitor system, and, based on the received signals, determine that the automobile has been stationary for an extended period of time. In addition, the computer system can receive signals from one or more sensors of the monitor system, and, based on the received signals, determine that the automobile interior temperature is significantly higher than (or lower than) an ambient temperature surrounding the automobile. In addition, the computer system can determine that a load is present in a seat. Based on these determinations, the computer system can determine that a body is present in the automobile seat under unfavorable conditions. At 406, an output signal can be provided indicating that the body is in the seat. For example, the computer system can provide the output signal as described above. At 408, a control signal to initiate one or more automobile functions can be provided. For example, the computer system can provide the control signal to cause the one or more automobile functions as described above.

Figure 5:
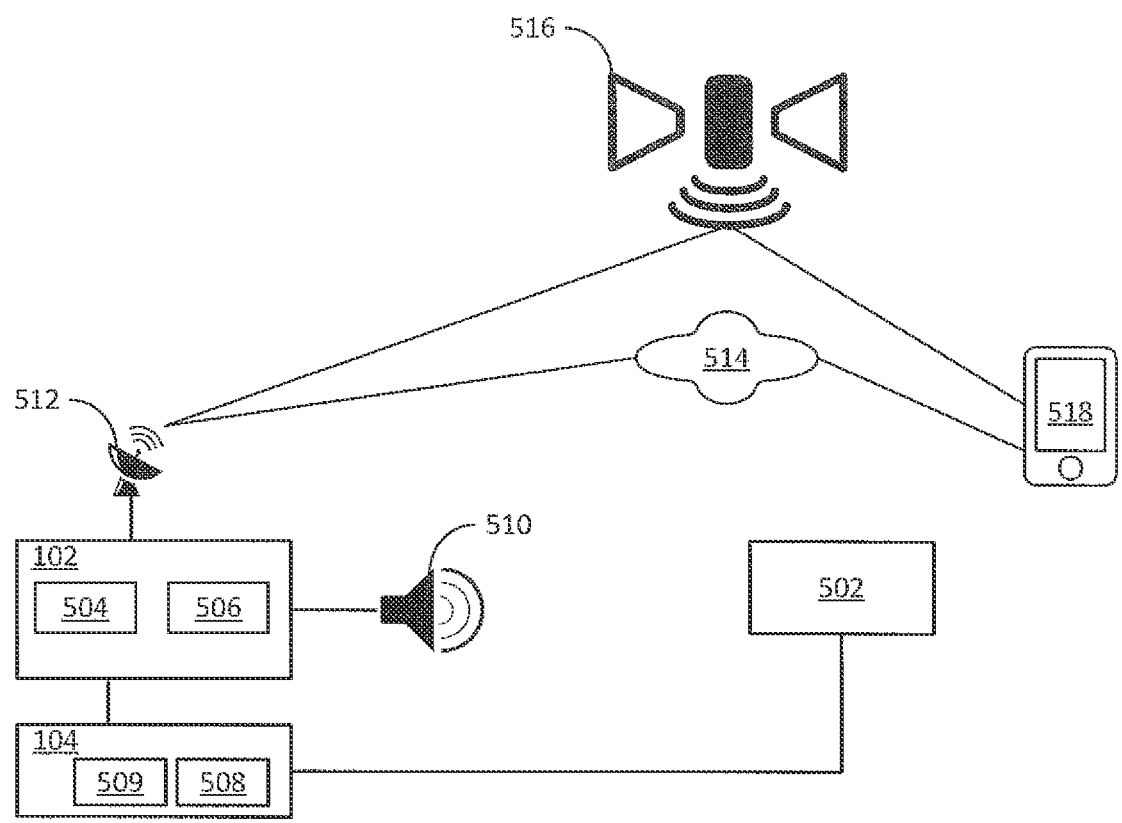
FIG. 5 is a schematic diagram showing an example of processing circuitry for responding to the presence of a body in an automobile seat.

FIG. 5 is a schematic diagram showing an example of a monitoring system including processing circuitry 104 for responding to the presence of a body in an automobile seat. The monitoring system can include a sensor 502 such as one of the sensors described above with reference to FIGS. 1A-1G. The processing circuitry 104 can include hardware 508, firmware 509, software or combinations of them. The processing circuitry 104 is connected to the automobile engine 102. For example, the automobile engine 102 can include or be connected to a computer system that includes a computer-readable medium 504 storing instructions or the environmental conditions (or both). The computer system can include a data processing apparatus 506 (e.g., one or more processors) which can execute the instructions stored in the computer-readable medium 504 to perform one or more automobile operations, such as those described above, in response to receiving control signals from the processing circuitry 104. The automobile or the monitoring system (or both) can include a transmitter 512 to transmit signals to a computer system 518 (e.g., a mobile device, a computer system of a service provider, a computer system of emergency personnel, or other computer system) over a wired or wireless network 514 or over a satellite network 516.

Figure 6:
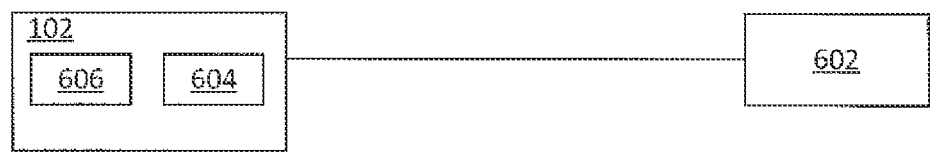
FIG. 6 is a schematic diagram showing an example of a computer system for responding to the presence of a body in an automobile seat.

FIG. 6 is a schematic diagram showing an example of a monitoring system including a computer system for responding to the presence of a body in an automobile seat. For example, the processing circuitry 104 or the computer system described above can be configured as part of a computer system of the automobile engine 102. The automobile engine 102 can include a computer-readable storage medium 604 storing instructions executable by data processing apparatus 606 (e.g., one or more processors) to perform the operations described here. The monitoring system can be connected to a sensor 602.

Implementations of the subject matter and the operations described in this disclosure can be implemented in digital electronic circuitry, or in computer software, firmware, or hardware, including the structures disclosed in this disclosure and their structural equivalents, or in combinations of one or more of them. Implementations of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium, for example, the computer-readable medium, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical and/or non-transitory components or media (for example, multiple CDs, disks, or other storage devices).

A number of implementations of the subject matter have been described. Other implementations are within the scope of the following claims.

What is claimed is:

1. A method comprising:
after an automobile engine has stopped operating, implementing, by processing circuitry, an operation to determine a presence of a body in a seat of the automobile;
in response to implementing the operation, determining the presence of the body in the seat of the automobile;
in response to determining the presence of the body in the seat of the automobile:
providing, by the processing circuitry, a notification indicating the presence of the body in the seat;
capturing an image of a seat of the automobile using a camera;
transmitting the image to a mobile device over a data transmission network;
executing, on the mobile device, a computer software application configured to provide an alert wherein the mobile device is connected to the automobile over the data transmission network;

executing, on the mobile device, the computer software application to display the image in a user interface of the mobile device;

transmitting a control signal from the computer software application on the mobile device to the automobile to cause one or more automobile functions to be performed, wherein the one or more functions comprises restarting a temperature control system of the automobile;

executing, by the processing circuitry, a timer for a duration after determining the presence of the body in the seat of the automobile; and after the expiration of the duration, ceasing, by the processing circuitry, to provide the notification and the control signal, wherein the one or more automobile functions cease to be performed in response to ceasing to provide the control signal.

2. The method of claim 1, wherein providing the notification indicating the presence of the body in the seat comprises providing an output signal to cause an alarm system of the automobile to sound.

3. The method of claim 1, wherein the one or more automobile functions further comprises restarting the automobile engine.

4. The method of claim 1, wherein providing the notification comprises transmitting a second notification to at least one computer system over a second data transmission network.

5. The method of claim 4, wherein the second data transmission network is at least one of a wired network, a wireless network, a Bluetooth network, or a Global Positioning Satellite (GPS) network.

6. The method of claim 4, wherein the at least one computer system is a computer system of a service provider that monitors the automobile.

7. The method of claim 4, further comprising transmitting an identifier representing a geographic location of the automobile over the second data transmission network.

8. The method of claim 1, wherein the seat of the automobile includes at least one of a front-facing child seat, a rearward facing infant seat, a booster seat, a seat for a handicapped person or a seat for an elderly person.

9. The method of claim 1, wherein determining the presence of the body in the seat of the automobile comprises determining the presence of the body in the seat of the automobile for a threshold amount of time starting from a time at which the automobile engine stopped operating.

10. The method of claim 1, further comprising, after providing the notification indicating the presence of the body in the seat:

sensing, for the duration, if the body is present in the seat;

determining the presence or an absence of the body in the seat before the duration expires in response to the sensing; and continuing or ceasing to provide the notification in response to determining the presence or the absence, respectively, of the body in the seat after the duration expires.

11. The method of claim 1, wherein determining the presence of the body in the seat comprises determining the presence of the body in the seat based on a load value represented by a load signal received from a load sensor connected to the seat and a second load value represented by a second load signal received from a second load sensor connected to a child seat.

12. The method of claim 1, wherein determining the presence of the body in the seat comprises determining the presence of the body in the seat based on a signal received from a contact sensor connected to a fastening mechanism installed on the seat, the contact sensor configured to transmit the signal in response to the fastening mechanism being engaged to fasten the body to the seat.

13. The method of claim 1, further comprising determining that the automobile engine has stopped operating by determining that an ignition of the automobile engine has gone to ground.

14. A method comprising:

determining, by processing circuitry implemented in an automobile, if an environmental automobile condition from among a plurality of environmental automobile conditions is satisfied, wherein a satisfied environmental condition comprises a difference between an interior temperature in a passenger compartment of the automobile and an ambient temperature being outside a predetermined range;

determining that a load is present in a seat of the automobile when the environmental automobile condition is satisfied;

providing an output signal indicating that the load is present in the seat of the automobile when the environmental automobile condition is satisfied;

capturing an image of the seat of the automobile using a camera;

transmitting the image to a mobile device over a data transmission network;

executing, on the mobile device, a computer software application configured to provide an alert wherein the mobile device is connected to the automobile over a data transmission network;

executing, on the mobile device, the computer software application to display the image in a user interface of the mobile device;

transmitting a control signal from the computer software application on the mobile device to the automobile; and restarting the temperature control system of the automobile upon receiving the control signal.

15. An automobile monitoring system comprising:

a sensor connected to a seat of an automobile, the sensor to determine a presence of a body in the seat; and processing circuitry to perform operations comprising:

after an automobile engine has stopped operating, starting a timer for a duration, the processing circuitry to determine the presence of the body in the seat of the automobile based on a signal received from the sensor after the duration expires;

after the automobile engine has stopped operating and before the duration expires:

determining that the automobile has been locked;

receiving the signal from the sensor indicating the presence of the body in the seat;

providing a notification indicating the presence of the body in response to receiving the signal indicating the presence of the body in the seat of the automobile;

when the difference between an interior temperature in a passenger compartment of the automobile and the ambient temperature is outside a predetermined range, restarting a temperature control system of the automobile to adjust the interior temperature;

causing a camera to capture an image of the seat of the automobile;

transmitting the image to a mobile device over the data transmission network;

causing the mobile device to execute a computer software application configured to provide an alert wherein the mobile device is connected to the automobile over a data transmission network;

causing the mobile device to execute the computer software application to display the image in a user interface of the mobile device;

transmitting a control signal from the computer software application on the mobile device to the automobile; and restarting the temperature control system of the automobile upon receiving the control signal.

16. The system of claim 15, wherein the sensor includes at least one of a load sensor to determine a presence of a load in the seat or a contact sensor connected to a fastening mechanism installed on the seat, the contact sensor configured to transmit the signal in response to fastening mechanism being engaged to fasten the body to the seat, and wherein providing the notification indicating the presence of the body in the seat comprises at least one of providing an output signal to cause an alarm system connected to the automobile engine to sound or providing a control signal to cause one or more automobile functions to be performed, the one or more automobile functions including at least one of restarting the automobile engine, or transmitting a second signal indicating the presence of the body in the seat to a computer system over the data transmission network.

* * * * *